US010069326B2

(12) United States Patent
Huang et al.

(10) Patent No.: US 10,069,326 B2
(45) Date of Patent: Sep. 4, 2018

(54) GOLF SYSTEM WITH WIRELESS CHARGING FUNCTION

(71) Applicant: Jogtek Corp., Taipei (TW)

(72) Inventors: Wei-Chun Huang, Taipei (TW); Tsung-Hsing Hsieh, Taipei (TW)

(73) Assignee: JOGTEK CORP., Taipei (TW)

( * ) Notice: Subject to any disclaimer, the term of this patent is extended or adjusted under 35 U.S.C. 154(b) by 153 days.

(21) Appl. No.: 15/204,327

(22) Filed: Jul. 7, 2016

(65) Prior Publication Data

US 2018/0013308 A1    Jan. 11, 2018

(51) Int. Cl.
    *H02J 7/02* (2016.01)
    *H02J 7/00* (2006.01)
    *A63B 55/00* (2015.01)

(52) U.S. Cl.
    CPC .............. *H02J 7/025* (2013.01); *A63B 55/00* (2013.01); *H02J 7/0042* (2013.01)

(58) Field of Classification Search
    CPC ....................................................... H02J 7/025
    USPC ....................................................... 320/108
    See application file for complete search history.

(56) References Cited

U.S. PATENT DOCUMENTS

| 6,236,186 | B1* | 5/2001 | Helton | .................. | H01M 10/42 |
| | | | | | 320/106 |
| 8,339,096 | B2* | 12/2012 | Osada | ................. | G06K 19/0701 |
| | | | | | 320/108 |
| 8,344,685 | B2* | 1/2013 | Bertness | ................. | G06Q 99/00 |
| | | | | | 320/104 |
| 8,384,519 | B2* | 2/2013 | Kuhl | .................... | G06K 7/0008 |
| | | | | | 340/10.1 |
| 8,629,654 | B2* | 1/2014 | Partovi | ................... | H01F 5/003 |
| | | | | | 320/108 |
| 2011/0130093 | A1* | 6/2011 | Walley | ................ | G06K 7/10207 |
| | | | | | 455/41.1 |
| 2014/0000771 | A1* | 1/2014 | Sherman | .................. | A45C 3/06 |
| | | | | | 150/106 |
| 2015/0035473 | A1* | 2/2015 | Zhou | ..................... | H02J 7/0052 |
| | | | | | 320/103 |

* cited by examiner

*Primary Examiner* — Samuel Berhanu
*Assistant Examiner* — Tessema Kebede
(74) *Attorney, Agent, or Firm* — Chun-Ming Shih; HDLS IPR Services

(57) ABSTRACT

A golf system with a wireless charging function includes a golf bag, an in-bag wireless rechargeable battery apparatus, an in-bag charging apparatus and an out-of-bag wireless charging apparatus. The in-bag charging apparatus includes an in-bag charging control circuit and an in-bag wireless charging module. The out-of-bag wireless charging apparatus converts an original voltage into an out-of-bag wireless charging signal. The out-of-bag wireless charging apparatus utilizes the out-of-bag wireless charging signal to wirelessly charge the in-bag wireless rechargeable battery apparatus. The in-bag wireless rechargeable battery apparatus sends a battery voltage to the in-bag charging control circuit. The in-bag charging control circuit sends the battery voltage to the in-bag wireless charging module. The in-bag wireless charging module converts the battery voltage into an in-bag wireless charging signal.

2 Claims, 5 Drawing Sheets

GOLF SYSTEM WITH WIRELESS CHARGING FUNCTION

BACKGROUND OF THE INVENTION

Field of the Invention

The present invention relates to a golf system, and especially relates to a golf system with a wireless charging function.

Description of the Related Art

Modern people love sports, so that many ball games have emerged. Golf is one of the popular ball games. Usually, golf clubs are arranged inside the golf bag. Then, the golf bag is carried to move. Therefore, the golf bag is indispensable for the golf sport.

However, current golf bag can only accommodate golf clubs. The golf bag does not have human-nature electronic functions, such as comprising the refrigerating apparatus to cool beverages to drink in summer. It is a pity.

SUMMARY OF THE INVENTION

In order to solve the above-mentioned problems, an object of the present invention is to provide a golf system with a wireless charging function.

In order to solve the above-mentioned problems, another object of the present invention is to provide a golf system with a wireless charging function.

In order to achieve the object of the present invention mentioned above, the golf system is applied to a power supply apparatus. The golf system comprises a golf bag, an in-bag wireless rechargeable battery apparatus, an in-bag charging apparatus and an out-of-bag wireless charging apparatus. The power supply apparatus is arranged outside the golf bag. The in-bag wireless rechargeable battery apparatus is arranged inside the golf bag. The in-bag charging apparatus is arranged inside the golf bag. The in-bag charging apparatus is electrically connected to the in-bag wireless rechargeable battery apparatus. The out-of-bag wireless charging apparatus is arranged outside the golf bag. The out-of-bag wireless charging apparatus is wirelessly electrically connected to the in-bag wireless rechargeable battery apparatus. The out-of-bag wireless charging apparatus is electrically connected to the power supply apparatus. The in-bag charging apparatus comprises an in-bag charging control circuit and an in-bag wireless charging module. The in-bag charging control circuit is electrically connected to the in-bag wireless rechargeable battery apparatus. The in-bag wireless charging module is electrically connected to the in-bag charging control circuit. The power supply apparatus sends an original voltage to the out-of-bag wireless charging apparatus. After the out-of-bag wireless charging apparatus receives the original voltage, the out-of-bag wireless charging apparatus converts the original voltage into an out-of-bag wireless charging signal. The out-of-bag wireless charging apparatus utilizes the out-of-bag wireless charging signal to wirelessly charge the in-bag wireless rechargeable battery apparatus. The in-bag wireless rechargeable battery apparatus sends a battery voltage to the in-bag charging control circuit. After the in-bag charging control circuit receives the battery voltage, the in-bag charging control circuit sends the battery voltage to the in-bag wireless charging module. After the in-bag wireless charging module receives the battery voltage, the in-bag wireless charging module converts the battery voltage into an in-bag wireless charging signal.

Moreover, the golf system further comprises an in-bag electronic apparatus. The in-bag electronic apparatus is arranged inside the golf bag. The in-bag electronic apparatus is wirelessly electrically connected to the in-bag wireless charging module. The in-bag wireless charging module utilizes the in-bag wireless charging signal to wirelessly charge the in-bag electronic apparatus.

Moreover, the out-of-bag wireless charging apparatus comprises an out-of-bag charging control circuit, an out-of-bag wireless charging transmitter and an out-of-bag wireless reader-writer. The out-of-bag charging control circuit is electrically connected to the power supply apparatus. The out-of-bag wireless charging transmitter is electrically connected to the out-of-bag charging control circuit. The out-of-bag wireless charging transmitter is wirelessly electrically connected to the in-bag wireless rechargeable battery apparatus. The out-of-bag wireless reader-writer is electrically connected to the out-of-bag charging control circuit. The out-of-bag wireless reader-writer is wirelessly electrically connected to the in-bag wireless rechargeable battery apparatus.

Moreover, the in-bag wireless rechargeable battery apparatus comprises an in-bag battery control circuit, an in-bag wireless charging receiver and an in-bag dynamic wireless tag. The in-bag battery control circuit is electrically connected to the in-bag charging control circuit. The in-bag wireless charging receiver is electrically connected to the in-bag battery control circuit. The in-bag wireless charging receiver is wirelessly electrically connected to the out-of-bag wireless charging transmitter. The in-bag dynamic wireless tag is electrically connected to the in-bag battery control circuit. The in-bag dynamic wireless tag is wirelessly electrically connected to the out-of-bag wireless reader-writer. The in-bag battery control circuit comprises a rechargeable battery. The power supply apparatus sends the original voltage to the out-of-bag charging control circuit. After the out-of-bag charging control circuit receives the original voltage, the out-of-bag charging control circuit converts the original voltage into an original conversion voltage. The out-of-bag wireless reader-writer wirelessly identifies the in-bag dynamic wireless tag. If the out-of-bag wireless reader-writer wirelessly identifies the in-bag dynamic wireless tag successfully, the out-of-bag wireless reader-writer informs the out-of-bag charging control circuit that the out-of-bag wireless reader-writer wirelessly identifies the in-bag dynamic wireless tag successfully, so that the out-of-bag charging control circuit sends the original conversion voltage to the out-of-bag wireless charging transmitter. After the out-of-bag wireless charging transmitter receives the original conversion voltage, the out-of-bag wireless charging transmitter converts the original conversion voltage into the out-of-bag wireless charging signal. The out-of-bag wireless charging transmitter utilizes the out-of-bag wireless charging signal to wirelessly charge the in-bag wireless rechargeable battery apparatus. If the out-of-bag wireless reader-writer wirelessly identifies the in-bag dynamic wireless tag successfully, the in-bag battery control circuit utilizes the in-bag dynamic wireless tag to be aware that the out-of-bag wireless reader-writer wirelessly identifies the in-bag dynamic wireless tag successfully, so that the in-bag battery control circuit receives the out-of-bag wireless charging signal through the in-bag wireless charging receiver to charge the rechargeable battery. The in-bag battery control circuit sends the battery voltage to the in-bag charging control circuit.

Moreover, the in-bag wireless charging module comprises an in-bag wireless charging transmitter and an in-bag wireless reader-writer. The in-bag wireless charging transmitter is electrically connected to the in-bag charging control circuit. The in-bag wireless charging transmitter is wirelessly electrically connected to the in-bag electronic apparatus. The in-bag wireless reader-writer is electrically connected to the in-bag charging control circuit. The in-bag wireless reader-writer is wirelessly electrically connected to the in-bag electronic apparatus.

Moreover, the in-bag electronic apparatus comprises an electronic apparatus side charging control circuit, an electronic apparatus side wireless charging receiver, an electronic apparatus side dynamic wireless tag and an electronic device. The electronic apparatus side wireless charging receiver is electrically connected to the electronic apparatus side charging control circuit. The electronic apparatus side wireless charging receiver is wirelessly electrically connected to the in-bag wireless charging transmitter. The electronic apparatus side dynamic wireless tag is electrically connected to the electronic apparatus side charging control circuit. The electronic apparatus side dynamic wireless tag is wirelessly electrically connected to the in-bag wireless reader-writer. The electronic device is electrically connected to the electronic apparatus side charging control circuit. The in-bag wireless reader-writer wirelessly identifies the electronic apparatus side dynamic wireless tag. If the in-bag wireless reader-writer wirelessly identifies the electronic apparatus side dynamic wireless tag successfully, the in-bag wireless reader-writer informs the in-bag charging control circuit that the in-bag wireless reader-writer wirelessly identifies the electronic apparatus side dynamic wireless tag successfully, so that the in-bag charging control circuit sends the battery voltage to the in-bag wireless charging transmitter. After the in-bag wireless charging transmitter receives the battery voltage, the in-bag wireless charging transmitter converts the battery voltage into the in-bag wireless charging signal. The in-bag wireless charging transmitter utilizes the in-bag wireless charging signal to wirelessly charge the in-bag electronic apparatus. If the in-bag wireless reader-writer wirelessly identifies the electronic apparatus side dynamic wireless tag successfully, the electronic apparatus side charging control circuit utilizes the electronic apparatus side dynamic wireless tag to be aware that the in-bag wireless reader-writer wirelessly identifies the electronic apparatus side dynamic wireless tag successfully, so that the electronic apparatus side charging control circuit receives the in-bag wireless charging signal through the electronic apparatus side wireless charging receiver to convert the in-bag wireless charging signal into a driving voltage. The electronic apparatus side charging control circuit sends the driving voltage to the electronic device to drive the electronic device.

Moreover, the electronic device is a refrigerating apparatus, a heating apparatus, a wired charging module or a wireless charging module.

In order to achieve the object of the present invention mentioned above, the golf system is applied to a power supply apparatus and a handheld electronic apparatus. The golf system comprises a golf bag, an in-bag wireless rechargeable battery apparatus, an in-bag charging apparatus and an out-of-bag wireless charging apparatus. The power supply apparatus is arranged outside the golf bag. The in-bag wireless rechargeable battery apparatus is arranged inside the golf bag. The in-bag charging apparatus is arranged inside the golf bag. The in-bag charging apparatus is electrically connected to the in-bag wireless rechargeable battery apparatus. The out-of-bag wireless charging apparatus is arranged outside the golf bag. The out-of-bag wireless charging apparatus is wirelessly electrically connected to the in-bag wireless rechargeable battery apparatus. The out-of-bag wireless charging apparatus is electrically connected to the power supply apparatus. The in-bag charging apparatus comprises an in-bag charging control circuit and a wired charging port. The in-bag charging control circuit is electrically connected to the in-bag wireless rechargeable battery apparatus. The wired charging port is electrically connected to the in-bag charging control circuit and the handheld electronic apparatus. The power supply apparatus sends an original voltage to the out-of-bag wireless charging apparatus. After the out-of-bag wireless charging apparatus receives the original voltage, the out-of-bag wireless charging apparatus converts the original voltage into an out-of-bag wireless charging signal. The out-of-bag wireless charging apparatus utilizes the out-of-bag wireless charging signal to wirelessly charge the in-bag wireless rechargeable battery apparatus. The in-bag wireless rechargeable battery apparatus sends a battery voltage to the in-bag charging control circuit. After the in-bag charging control circuit receives the battery voltage, the in-bag charging control circuit sends the battery voltage to the handheld electronic apparatus through the wired charging port.

Moreover, the out-of-bag wireless charging apparatus comprises an out-of-bag charging control circuit, an out-of-bag wireless charging transmitter and an out-of-bag wireless reader-writer. The out-of-bag charging control circuit is electrically connected to the power supply apparatus. The out-of-bag wireless charging transmitter is electrically connected to the out-of-bag charging control circuit. The out-of-bag wireless charging transmitter is wirelessly electrically connected to the in-bag wireless rechargeable battery apparatus. The out-of-bag wireless reader-writer is electrically connected to the out-of-bag charging control circuit. The out-of-bag wireless reader-writer is wirelessly electrically connected to the in-bag wireless rechargeable battery apparatus.

Moreover, the in-bag wireless rechargeable battery apparatus comprises an in-bag battery control circuit, an in-bag wireless charging receiver and an in-bag dynamic wireless tag. The in-bag battery control circuit is electrically connected to the in-bag charging control circuit. The in-bag wireless charging receiver is electrically connected to the in-bag battery control circuit. The in-bag wireless charging receiver is wirelessly electrically connected to the out-of-bag wireless charging transmitter. The in-bag dynamic wireless tag is electrically connected to the in-bag battery control circuit. The in-bag dynamic wireless tag is wirelessly electrically connected to the out-of-bag wireless reader-writer. The in-bag battery control circuit comprises a rechargeable battery. The power supply apparatus sends the original voltage to the out-of-bag charging control circuit. After the out-of-bag charging control circuit receives the original voltage, the out-of-bag charging control circuit converts the original voltage into an original conversion voltage. The out-of-bag wireless reader-writer wirelessly identifies the in-bag dynamic wireless tag. If the out-of-bag wireless reader-writer wirelessly identifies the in-bag dynamic wireless tag successfully, the out-of-bag wireless reader-writer informs the out-of-bag charging control circuit that the out-of-bag wireless reader-writer wirelessly identifies the in-bag dynamic wireless tag successfully, so that the out-of-bag charging control circuit sends the original conversion voltage to the out-of-bag wireless charging transmitter. After the out-of-bag wireless charging transmitter receives the original conversion voltage, the out-of-bag wireless charging transmitter converts the original conversion voltage into the out-of-bag wireless charging signal. The out-of-bag wireless charging transmitter utilizes the out-of-bag wireless charging signal to wirelessly charge the in-bag wireless rechargeable battery apparatus. If the out-of-bag wireless reader-writer wirelessly identifies the in-bag dynamic wireless tag successfully, the in-bag battery control circuit utilizes the in-bag dynamic wireless tag to be aware that the out-of-bag wireless reader-writer wirelessly identifies the in-bag dynamic wireless tag successfully, so that the in-bag battery control circuit receives the out-of-bag wireless charging signal through the in-bag wireless charging receiver to charge the rechargeable battery. The in-bag battery control circuit sends the battery voltage to the in-bag charging control circuit.

The advantage of the present invention is to provide a golf system with a wireless charging function.

DETAILED DESCRIPTION OF THE INVENTION

Please refer to following detailed description and figures for the technical content of the present invention. The following detailed description and figures are referred for the present invention, but the present invention is not limited to it.

Figure 1:
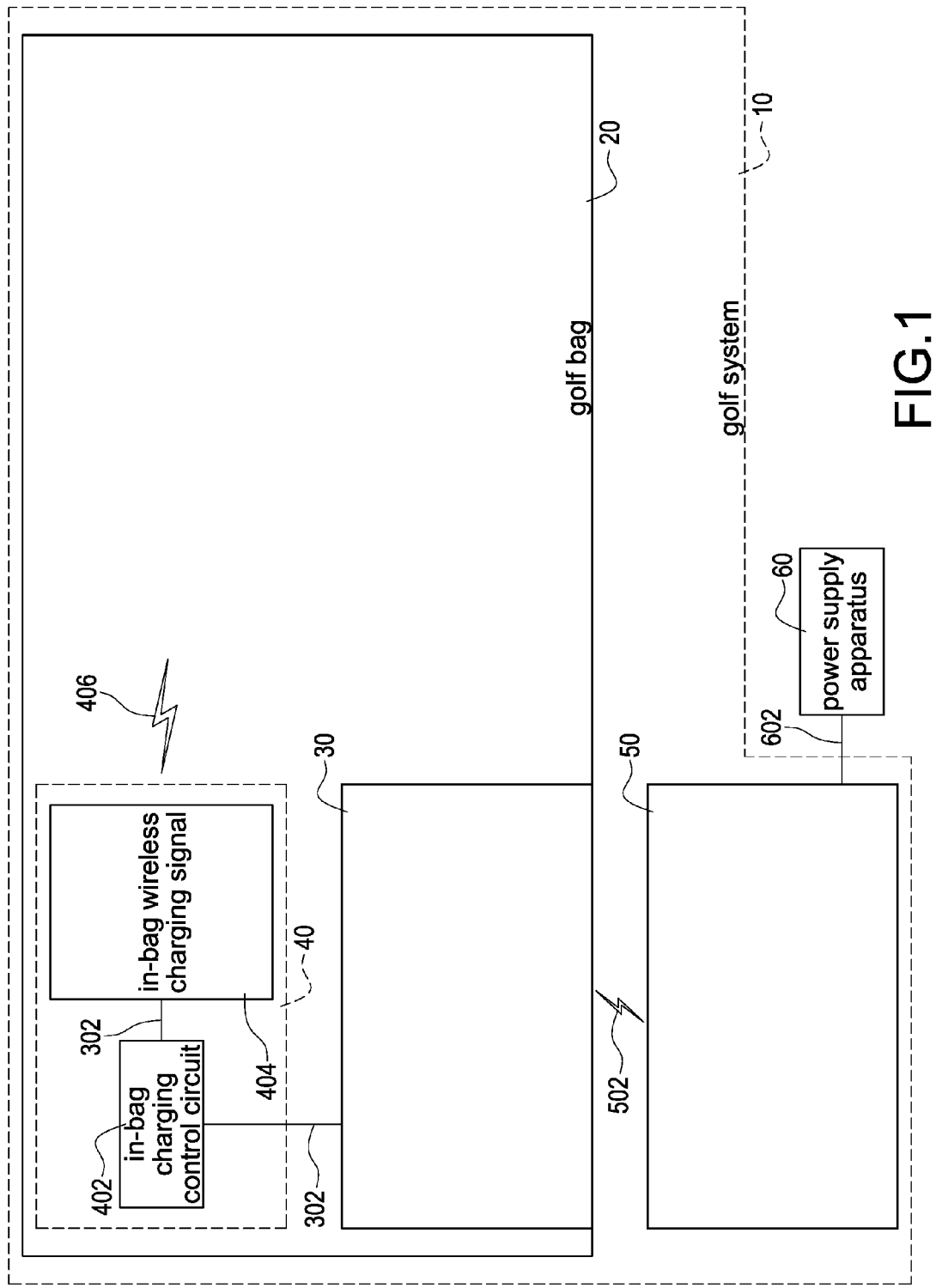
FIG. 1 shows a block diagram of the first embodiment of the golf system of the present invention.

FIG. 1 shows a block diagram of the first embodiment of the golf system of the present invention. A golf system 10 with a wireless charging function is applied to a power supply apparatus 60. The golf system 10 comprises a golf bag 20, an in-bag wireless rechargeable battery apparatus 30, an in-bag charging apparatus 40 and an out-of-bag wireless charging apparatus 50. The in-bag charging apparatus 40 comprises an in-bag charging control circuit 402 and an in-bag wireless charging module 404.

The power supply apparatus 60 is arranged outside the golf bag 20. The in-bag wireless rechargeable battery apparatus 30 is arranged inside the golf bag 20. The in-bag charging apparatus 40 is arranged inside the golf bag 20. The in-bag charging apparatus 40 is electrically connected to the in-bag wireless rechargeable battery apparatus 30. The out-of-bag wireless charging apparatus 50 is arranged outside the golf bag 20. The out-of-bag wireless charging apparatus 50 is wirelessly electrically connected to the in-bag wireless rechargeable battery apparatus 30. The out-of-bag wireless charging apparatus 50 is electrically connected to the power supply apparatus 60. The in-bag charging control circuit 402 is electrically connected to the in-bag wireless rechargeable battery apparatus 30. The in-bag wireless charging module 404 is electrically connected to the in-bag charging control circuit 402.

The power supply apparatus 60 sends an original voltage 602 to the out-of-bag wireless charging apparatus 50. After the out-of-bag wireless charging apparatus 50 receives the original voltage 602, the out-of-bag wireless charging apparatus 50 converts the original voltage 602 into an out-of-bag wireless charging signal 502. The out-of-bag wireless charging apparatus 50 utilizes the out-of-bag wireless charging signal 502 to wirelessly charge the in-bag wireless rechargeable battery apparatus 30. The in-bag wireless rechargeable battery apparatus 30 sends a battery voltage 302 to the in-bag charging control circuit 402. After the in-bag charging control circuit 402 receives the battery voltage 302, the in-bag charging control circuit 402 sends the battery voltage 302 to the in-bag wireless charging module 404. After the in-bag wireless charging module 404 receives the battery voltage 302, the in-bag wireless charging module 404 converts the battery voltage 302 into an in-bag wireless charging signal 406.

Moreover, the in-bag wireless rechargeable battery apparatus 30 is a portable rechargeable battery module, which can be taken out from inside the golf bag 20 to be charged wirelessly or through wires. The power supply apparatus 60 can be a vehicle charger providing 12 or 24 volts direct current voltages. The power supply apparatus 60 can be an alternating current voltage supply providing 100~240 volts alternating current voltages as well. The in-bag wireless charging signal 406 and the out-of-bag wireless charging signal 502 can be, for example but not limited to, high power signals.

Figure 2:
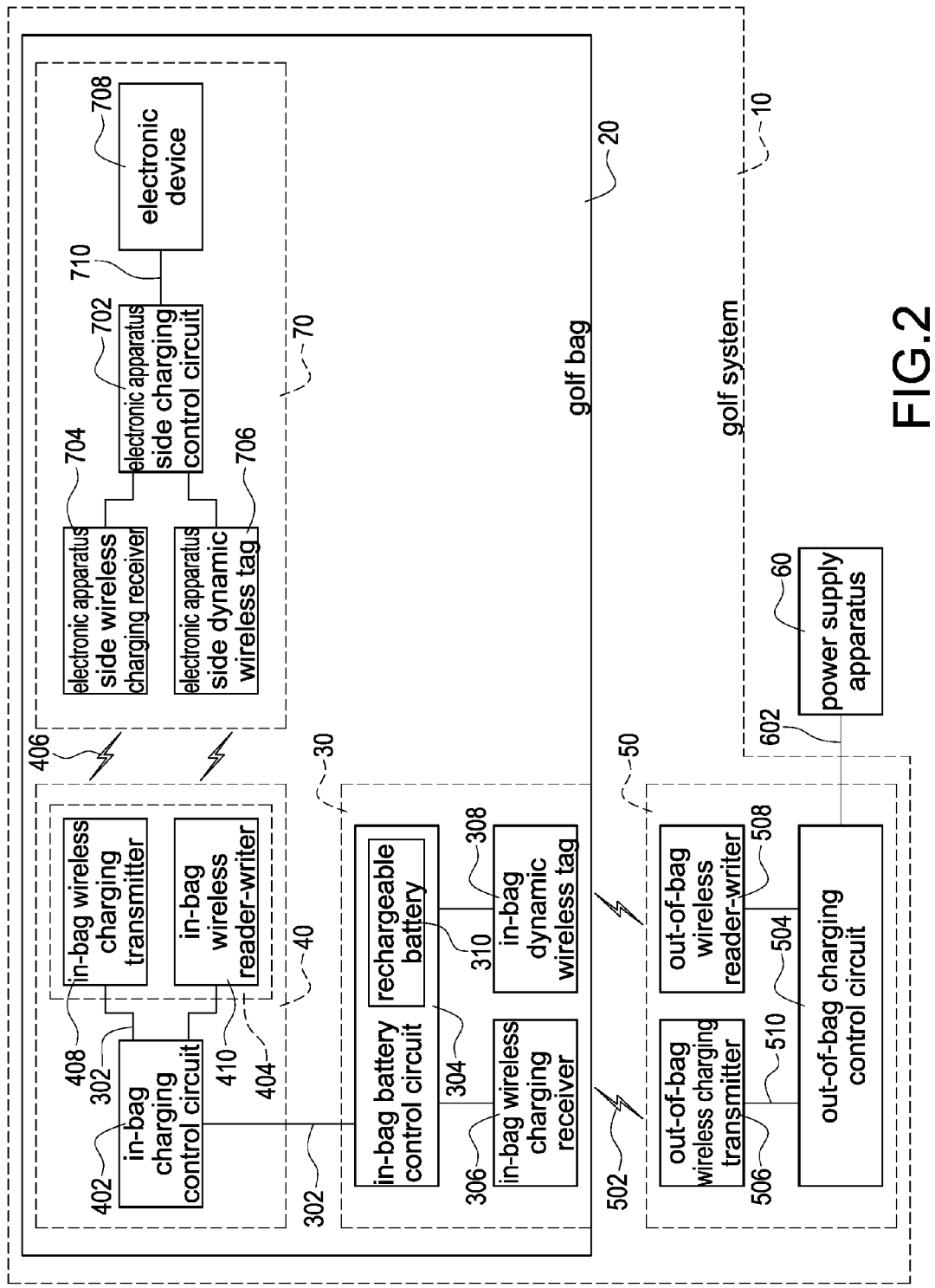
FIG. 2 shows a block diagram of the second embodiment of the golf system of the present invention.

FIG. 2 shows a block diagram of the second embodiment of the golf system of the present invention. The description for the elements shown in FIG. 2, which are similar to those shown in FIG. 1, is not repeated here for brevity. The golf system 10 further comprises an in-bag electronic apparatus 70. The in-bag electronic apparatus 70 is arranged inside the golf bag 20. The in-bag electronic apparatus 70 is wirelessly electrically connected to the in-bag wireless charging module 404. The in-bag wireless charging module 404 utilizes the in-bag wireless charging signal 406 to wirelessly charge the in-bag electronic apparatus 70.

The out-of-bag wireless charging apparatus 50 comprises an out-of-bag charging control circuit 504, an out-of-bag wireless charging transmitter 506 and an out-of-bag wireless reader-writer 508. The out-of-bag charging control circuit 504 is electrically connected to the power supply apparatus 60. The out-of-bag wireless charging transmitter 506 is electrically connected to the out-of-bag charging control circuit 504. The out-of-bag wireless charging transmitter 506 is wirelessly electrically connected to the in-bag wireless rechargeable battery apparatus 30. The out-of-bag wireless reader-writer 508 is electrically connected to the out-of-bag charging control circuit 504. The out-of-bag wireless reader-writer 508 is wirelessly electrically connected to the in-bag wireless rechargeable battery apparatus 30.

The in-bag wireless rechargeable battery apparatus 30 comprises an in-bag battery control circuit 304, an in-bag wireless charging receiver 306 and an in-bag dynamic wireless tag 308. The in-bag battery control circuit 304 is electrically connected to the in-bag charging control circuit 402. The in-bag wireless charging receiver 306 is electrically connected to the in-bag battery control circuit 304. The in-bag wireless charging receiver 306 is wirelessly electrically connected to the out-of-bag wireless charging transmitter 506. The in-bag dynamic wireless tag 308 is electrically connected to the in-bag battery control circuit 304. The in-bag dynamic wireless tag 308 is wirelessly electrically connected to the out-of-bag wireless reader-writer 508. The in-bag battery control circuit 304 comprises a rechargeable battery 310.

The power supply apparatus 60 sends the original voltage 602 to the out-of-bag charging control circuit 504. After the out-of-bag charging control circuit 504 receives the original voltage 602, the out-of-bag charging control circuit 504 converts the original voltage 602 into an original conversion voltage 510. The out-of-bag wireless reader-writer 508 wirelessly identifies the in-bag dynamic wireless tag 308. If the out-of-bag wireless reader-writer 508 wirelessly identifies the in-bag dynamic wireless tag 308 successfully, the out-of-bag wireless reader-writer 508 informs the out-of-bag charging control circuit 504 that the out-of-bag wireless reader-writer 508 wirelessly identifies the in-bag dynamic wireless tag 308 successfully, so that the out-of-bag charging control circuit 504 sends the original conversion voltage 510 to the out-of-bag wireless charging transmitter 506. After the out-of-bag wireless charging transmitter 506 receives the original conversion voltage 510, the out-of-bag wireless charging transmitter 506 converts the original conversion voltage 510 into the out-of-bag wireless charging signal 502. The out-of-bag wireless charging transmitter 506 utilizes the out-of-bag wireless charging signal 502 to wirelessly charge the in-bag wireless rechargeable battery apparatus 30.

If the out-of-bag wireless reader-writer 508 wirelessly identifies the in-bag dynamic wireless tag 308 successfully, the in-bag battery control circuit 304 utilizes the in-bag dynamic wireless tag 308 to be aware that the out-of-bag wireless reader-writer 508 wirelessly identifies the in-bag dynamic wireless tag 308 successfully, so that the in-bag battery control circuit 304 receives the out-of-bag wireless charging signal 502 through the in-bag wireless charging receiver 306 to charge the rechargeable battery 310. The in-bag battery control circuit 304 sends the battery voltage 302 to the in-bag charging control circuit 402.

The in-bag wireless charging module 404 comprises an in-bag wireless charging transmitter 408 and an in-bag wireless reader-writer 410. The in-bag wireless charging transmitter 408 is electrically connected to the in-bag charging control circuit 402. The in-bag wireless charging transmitter 408 is wirelessly electrically connected to the in-bag electronic apparatus 70. The in-bag wireless reader-writer 410 is electrically connected to the in-bag charging control circuit 402. The in-bag wireless reader-writer 410 is wirelessly electrically connected to the in-bag electronic apparatus 70.

The in-bag electronic apparatus 70 comprises an electronic apparatus side charging control circuit 702, an electronic apparatus side wireless charging receiver 704, an electronic apparatus side dynamic wireless tag 706 and an electronic device 708. The electronic apparatus side wireless charging receiver 704 is electrically connected to the electronic apparatus side charging control circuit 702. The electronic apparatus side wireless charging receiver 704 is wirelessly electrically connected to the in-bag wireless charging transmitter 408. The electronic apparatus side dynamic wireless tag 706 is electrically connected to the electronic apparatus side charging control circuit 702. The electronic apparatus side dynamic wireless tag 706 is wirelessly electrically connected to the in-bag wireless reader-writer 410. The electronic device 708 is electrically connected to the electronic apparatus side charging control circuit 702.

The in-bag wireless reader-writer 410 wirelessly identifies the electronic apparatus side dynamic wireless tag 706. If the in-bag wireless reader-writer 410 wirelessly identifies the electronic apparatus side dynamic wireless tag 706 successfully, the in-bag wireless reader-writer 410 informs the in-bag charging control circuit 402 that the in-bag wireless reader-writer 410 wirelessly identifies the electronic apparatus side dynamic wireless tag 706 successfully, so that the in-bag charging control circuit 402 sends the battery voltage 302 to the in-bag wireless charging transmitter 408. After the in-bag wireless charging transmitter 408 receives the battery voltage 302, the in-bag wireless charging transmitter 408 converts the battery voltage 302 into the in-bag wireless charging signal 406. The in-bag wireless charging transmitter 408 utilizes the in-bag wireless charging signal 406 to wirelessly charge the in-bag electronic apparatus 70.

If the in-bag wireless reader-writer 410 wirelessly identifies the electronic apparatus side dynamic wireless tag 706 successfully, the electronic apparatus side charging control circuit 702 utilizes the electronic apparatus side dynamic wireless tag 706 to be aware that the in-bag wireless reader-writer 410 wirelessly identifies the electronic apparatus side dynamic wireless tag 706 successfully, so that the electronic apparatus side charging control circuit 702 receives the in-bag wireless charging signal 406 through the electronic apparatus side wireless charging receiver 704 to convert the in-bag wireless charging signal 406 into a driving voltage 710. The electronic apparatus side charging control circuit 702 sends the driving voltage 710 to the electronic device 708 to drive the electronic device 708.

The electronic device 708 is a refrigerating apparatus, a heating apparatus, a wired charging module or a wireless charging module. If the electronic device 708 is the refrigerating apparatus, the electronic device 708 cools, for example, a beverage (not shown in FIG. 2). If the electronic device 708 is the heating apparatus, the electronic device 708 heats, for example, the beverage. If the electronic device 708 is the wired charging module or the wireless charging module, the electronic device 708 charges to a cellphone (not shown in FIG. 2).

Moreover, the in-bag wireless reader-writer 410 and the out-of-bag wireless reader-writer 508 are near field communication readers-writers or radio frequency identification readers-writers. The in-bag dynamic wireless tag 308 and the electronic apparatus side dynamic wireless tag 706 are near field communication tags or the radio frequency identification tags. The out-of-bag wireless reader-writer 508 utilizes the near field communication technology or the radio frequency identification technology to identify the in-bag dynamic wireless tag 308. The in-bag wireless reader-writer 410 utilizes the near field communication technology or the radio frequency identification technology to identify the electronic apparatus side dynamic wireless tag 706. Frequencies of the out-of-bag wireless charging signal 502 and the in-bag wireless charging signal 406 can be, for example but not limited to, 100 KHz~500 KHz. A communication signal frequency of the out-of-bag wireless reader-writer 508 and the in-bag dynamic wireless tag 308 can be, for example but not limited to, 13.56 MHz or 860 MHz~960 MHz. A communication signal frequency of the in-bag wireless reader-writer 410 and the electronic apparatus side dynamic wireless tag 706 can be, for example but not limited to, 13.56 MHz or 860 MHz~960 MHz.

Figure 3:
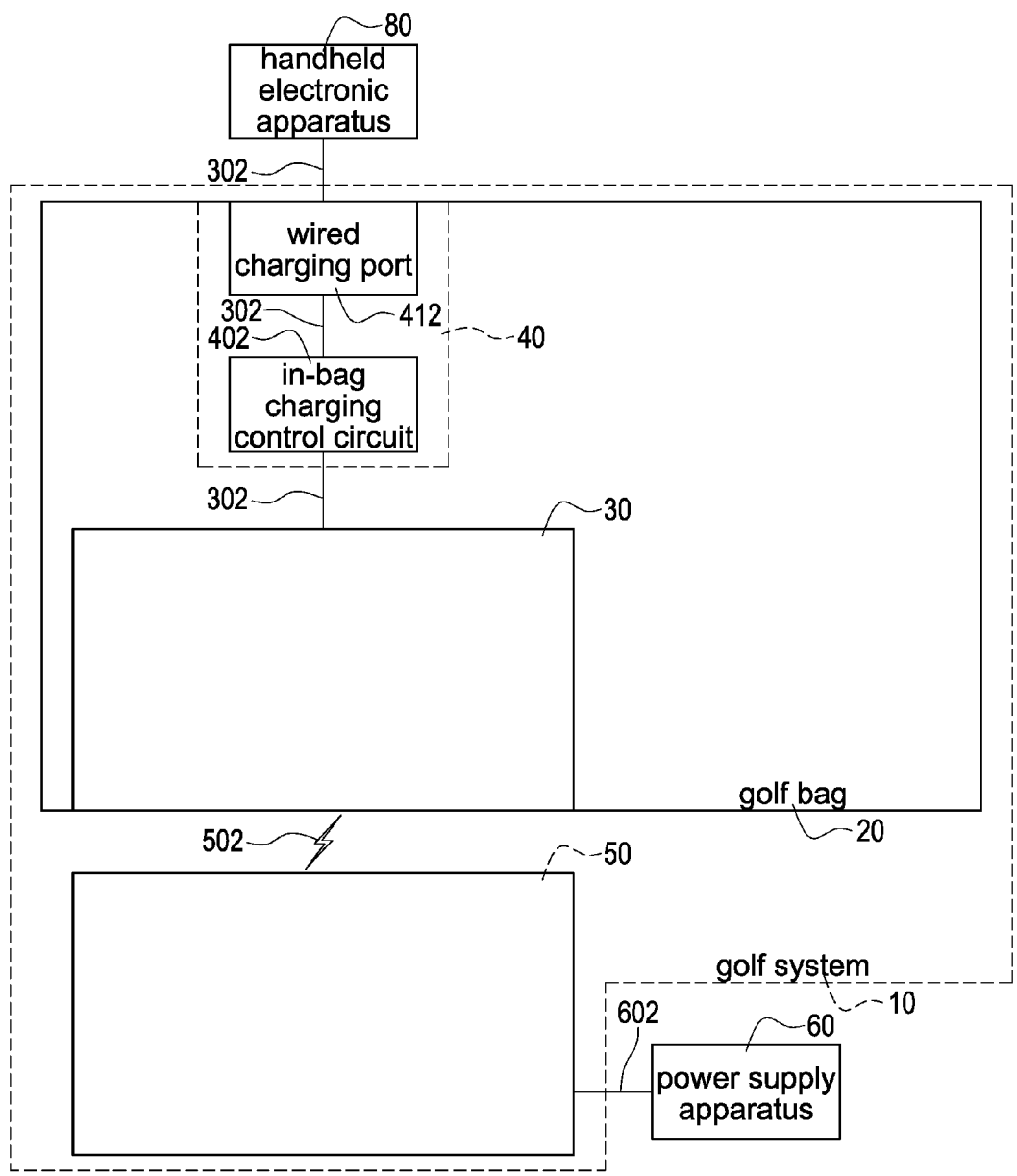
FIG. 3 shows a block diagram of the third embodiment of the golf system of the present invention.

FIG. 3 shows a block diagram of the third embodiment of the golf system of the present invention. A golf system 10 with a wireless charging function is applied to a power supply apparatus 60 and a handheld electronic apparatus 80. The golf system 10 comprises a golf bag 20, an in-bag wireless rechargeable battery apparatus 30, an in-bag charging apparatus 40 and an out-of-bag wireless charging apparatus 50. The in-bag charging apparatus 40 comprises an in-bag charging control circuit 402 and a wired charging port 412.

The power supply apparatus 60 is arranged outside the golf bag 20. The in-bag wireless rechargeable battery apparatus 30 is arranged inside the golf bag 20. The in-bag charging apparatus 40 is arranged inside the golf bag 20. The in-bag charging apparatus 40 is electrically connected to the in-bag wireless rechargeable battery apparatus 30. The out-of-bag wireless charging apparatus 50 is arranged outside the golf bag 20. The out-of-bag wireless charging apparatus 50 is wirelessly electrically connected to the in-bag wireless rechargeable battery apparatus 30. The out-of-bag wireless charging apparatus 50 is electrically connected to the power supply apparatus 60. The in-bag charging control circuit 402 is electrically connected to the in-bag wireless rechargeable battery apparatus 30. The wired charging port 412 is electrically connected to the in-bag charging control circuit 402 and the handheld electronic apparatus 80.

The power supply apparatus 60 sends an original voltage 602 to the out-of-bag wireless charging apparatus 50. After the out-of-bag wireless charging apparatus 50 receives the original voltage 602, the out-of-bag wireless charging apparatus 50 converts the original voltage 602 into an out-of-bag wireless charging signal 502. The out-of-bag wireless charging apparatus 50 utilizes the out-of-bag wireless charging signal 502 to wirelessly charge the in-bag wireless rechargeable battery apparatus 30. The in-bag wireless rechargeable battery apparatus 30 sends a battery voltage 302 to the in-bag charging control circuit 402. After the in-bag charging control circuit 402 receives the battery voltage 302, the in-bag charging control circuit 402 sends the battery voltage 302 to the handheld electronic apparatus 80 through the wired charging port 412.

Moreover, the in-bag wireless rechargeable battery apparatus 30 is a portable rechargeable battery module, which can be taken out from inside the golf bag 20 to be charged wirelessly or through wires. The power supply apparatus 60 can be a vehicle charger providing 12 or 24 volts direct current voltages. The power supply apparatus 60 can be an alternating current voltage supply providing 100~240 volts alternating current voltages as well. The in-bag wireless charging signal 406 and the out-of-bag wireless charging signal 502 can be, for example but not limited to, high power signals.

Figure 4:
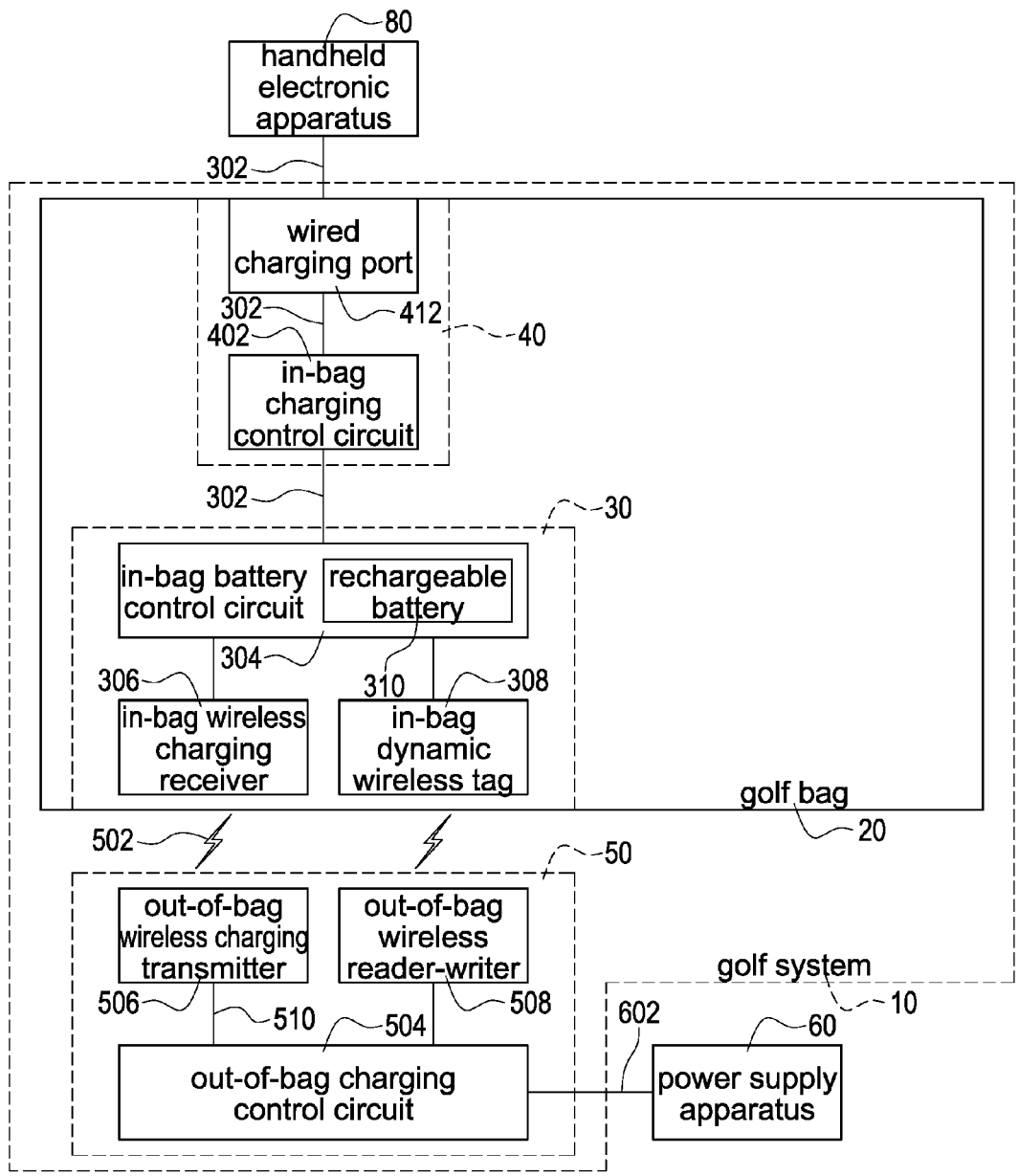
FIG. 4 shows a block diagram of the fourth embodiment of the golf system of the present invention.

FIG. 4 shows a block diagram of the fourth embodiment of the golf system of the present invention. The description for the elements shown in FIG. 4, which are similar to those shown in FIG. 3, is not repeated here for brevity.

The out-of-bag wireless charging apparatus 50 comprises an out-of-bag charging control circuit 504, an out-of-bag wireless charging transmitter 506 and an out-of-bag wireless reader-writer 508. The out-of-bag charging control circuit 504 is electrically connected to the power supply apparatus 60. The out-of-bag wireless charging transmitter 506 is electrically connected to the out-of-bag charging control circuit 504. The out-of-bag wireless charging transmitter 506 is wirelessly electrically connected to the in-bag wireless rechargeable battery apparatus 30. The out-of-bag wireless reader-writer 508 is electrically connected to the out-of-bag charging control circuit 504. The out-of-bag wireless reader-writer 508 is wirelessly electrically connected to the in-bag wireless rechargeable battery apparatus 30.

The in-bag wireless rechargeable battery apparatus 30 comprises an in-bag battery control circuit 304, an in-bag wireless charging receiver 306 and an in-bag dynamic wireless tag 308. The in-bag battery control circuit 304 is electrically connected to the in-bag charging control circuit 402. The in-bag wireless charging receiver 306 is electrically connected to the in-bag battery control circuit 304. The in-bag wireless charging receiver 306 is wirelessly electrically connected to the out-of-bag wireless charging transmitter 506. The in-bag dynamic wireless tag 308 is electrically connected to the in-bag battery control circuit 304. The in-bag dynamic wireless tag 308 is wirelessly electrically connected to the out-of-bag wireless reader-writer 508. The in-bag battery control circuit 304 comprises a rechargeable battery 310.

The power supply apparatus 60 sends the original voltage 602 to the out-of-bag charging control circuit 504. After the out-of-bag charging control circuit 504 receives the original voltage 602, the out-of-bag charging control circuit 504 converts the original voltage 602 into an original conversion voltage 510. The out-of-bag wireless reader-writer 508 wirelessly identifies the in-bag dynamic wireless tag 308. If the out-of-bag wireless reader-writer 508 wirelessly identifies the in-bag dynamic wireless tag 308 successfully, the out-of-bag wireless reader-writer 508 informs the out-of-bag charging control circuit 504 that the out-of-bag wireless reader-writer 508 wirelessly identifies the in-bag dynamic wireless tag 308 successfully, so that the out-of-bag charging control circuit 504 sends the original conversion voltage 510 to the out-of-bag wireless charging transmitter 506. After the out-of-bag wireless charging transmitter 506 receives the original conversion voltage 510, the out-of-bag wireless charging transmitter 506 converts the original conversion voltage 510 into the out-of-bag wireless charging signal 502. The out-of-bag wireless charging transmitter 506 utilizes the out-of-bag wireless charging signal 502 to wirelessly charge the in-bag wireless rechargeable battery apparatus 30.

If the out-of-bag wireless reader-writer 508 wirelessly identifies the in-bag dynamic wireless tag 308 successfully, the in-bag battery control circuit 304 utilizes the in-bag dynamic wireless tag 308 to be aware that the out-of-bag wireless reader-writer 508 wirelessly identifies the in-bag dynamic wireless tag 308 successfully, so that the in-bag battery control circuit 304 receives the out-of-bag wireless charging signal 502 through the in-bag wireless charging receiver 306 to charge the rechargeable battery 310. The in-bag battery control circuit 304 sends the battery voltage 302 to the in-bag charging control circuit 402.

Moreover, the out-of-bag wireless reader-writer 508 is a near field communication reader-writer or a radio frequency identification reader-writer. The in-bag dynamic wireless tag 308 is a near field communication tag or a radio frequency identification tag. The out-of-bag wireless reader-writer 508 utilizes the near field communication technology or the radio frequency identification technology to identify the in-bag dynamic wireless tag 308. A frequency of the out-of-bag wireless charging signal 502 can be, for example but not limited to, 100 KHz~500 KHz. A communication signal frequency of the out-of-bag wireless reader-writer 508 and the in-bag dynamic wireless tag 308 can be, for example but not limited to, 13.56 MHz or 860 MHz~960 MHz.

Figure 5:
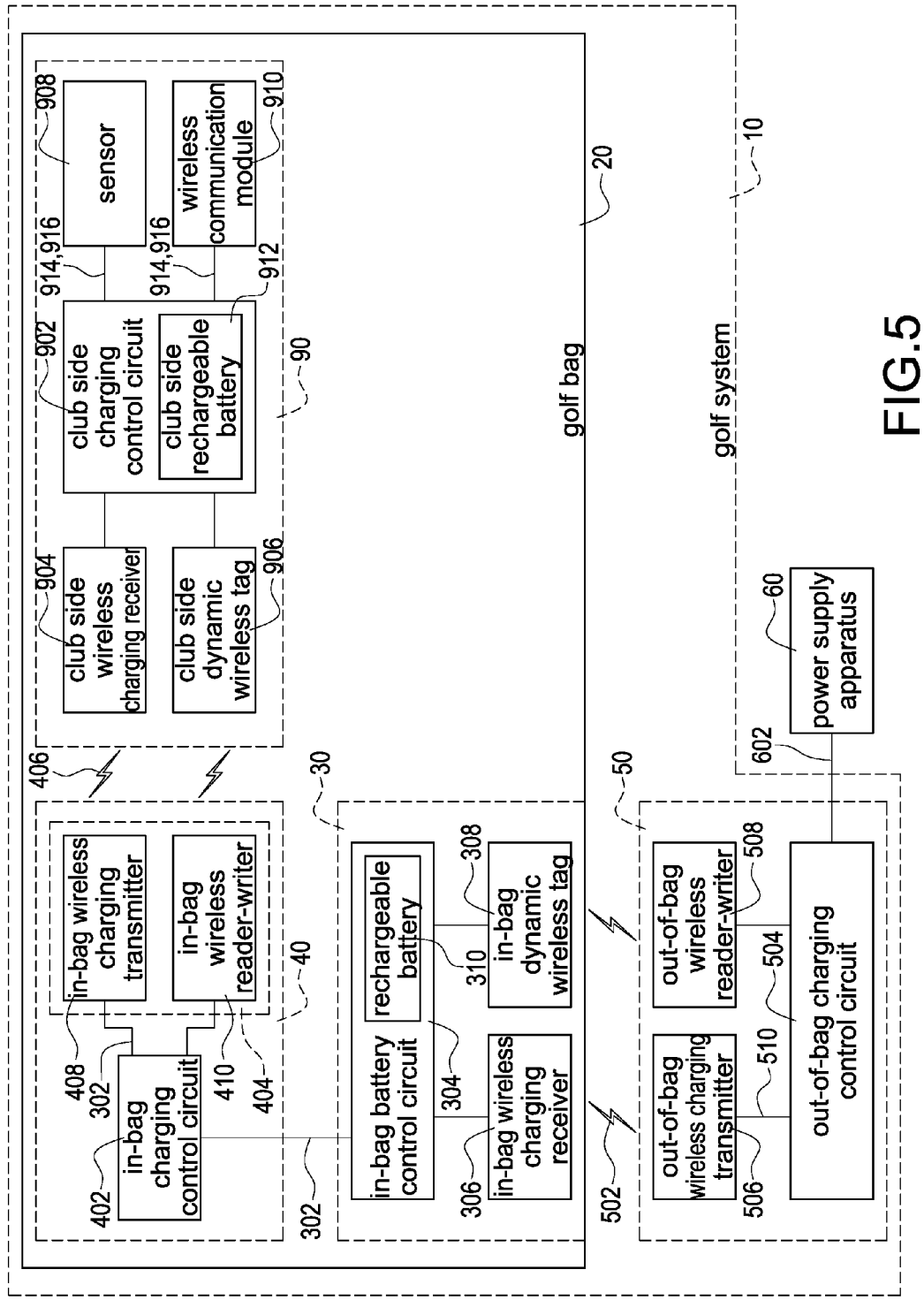
FIG. 5 shows a block diagram of the fifth embodiment of the golf system of the present invention.

Moreover, FIG. 5 shows a block diagram of the fifth embodiment of the golf system of the present invention. The description for the elements shown in FIG. 5, which are similar to those shown in FIG. 2, is not repeated here for brevity. Moreover, the golf system 10 further comprises a golf club 90. The golf club 90 is arranged inside the golf bag 20. The golf club 90 is wirelessly electrically connected to the in-bag wireless charging module 404. The in-bag wireless charging module 404 utilizes the in-bag wireless charging signal 406 to wirelessly charge the golf club 90.

Moreover, the golf club 90 comprises a club side charging control circuit 902, a club side wireless charging receiver 904, a club side dynamic wireless tag 906, a sensor 908 and a wireless communication module 910. The club side charging control circuit 902 comprises a club side rechargeable battery 912. The club side wireless charging receiver 904 is electrically connected to the club side charging control circuit 902. The club side wireless charging receiver 904 is wirelessly electrically connected to the in-bag wireless charging transmitter 408. The club side dynamic wireless tag 906 is electrically connected to the club side charging control circuit 902. The club side wireless charging receiver 904 is wirelessly electrically connected to the in-bag wireless reader-writer 410. The sensor 908 is electrically connected to the club side charging control circuit 902. The wireless communication module 910 is electrically connected to the club side charging control circuit 902.

The in-bag wireless reader-writer 410 wirelessly identifies the club side dynamic wireless tag 906. If the in-bag wireless reader-writer 410 wirelessly identifies the club side dynamic wireless tag 906 successfully, the in-bag wireless reader-writer 410 informs the in-bag charging control circuit 402 that the in-bag wireless reader-writer 410 wirelessly identifies the club side dynamic wireless tag 906 successfully, so that the in-bag charging control circuit 402 sends the battery voltage 302 to the in-bag wireless charging transmitter 408. After the in-bag wireless charging transmitter 408 receives the battery voltage 302, the in-bag wireless charging transmitter 408 converts the battery voltage 302 into the in-bag wireless charging signal 406. The in-bag wireless charging transmitter 408 utilizes the in-bag wireless charging signal 406 to wirelessly charge the golf club 90.

If the in-bag wireless reader-writer 410 wirelessly identifies the club side dynamic wireless tag 906 successfully, the club side charging control circuit 902 utilizes the club side dynamic wireless tag 906 to be aware that the in-bag wireless reader-writer 410 wirelessly identifies the club side dynamic wireless tag 906 successfully, so that the club side charging control circuit 902 receives the in-bag wireless charging signal 406 through the club side wireless charging receiver 904 to convert the in-bag wireless charging signal 406 into a driving voltage 914. The club side charging control circuit 902 sends the driving voltage 914 to the sensor 908 and the wireless communication module 910 to drive the sensor 908 and the wireless communication module 910.

The sensor 908 senses environment information to generate a sensing signal 916. The sensor 908 sends the sensing signal 916 to the club side charging control circuit 902. The club side charging control circuit 902 sends the sensing signal 916 to the wireless communication module 910. The wireless communication module 910 wirelessly sends the sensing signal 916 to a cellphone (not shown in FIG. 5).

The sensor 908 is, for example but not limited to, an accelerometer or a G-sensor. The wireless communication module 910 is, for example but not limited to, a Bluetooth wireless communication module. In an embodiment, the accelerometer senses swing information of the golf club 90 to generate the sensing signal 916. The accelerometer sends the sensing signal 916 to the club side charging control circuit 902. The club side charging control circuit 902 sends the sensing signal 916 to the Bluetooth wireless communication module. The Bluetooth wireless communication module wirelessly sends the sensing signal 916 to the cellphone, so that the user can watch the cellphone to be aware of the swing information.

In an embodiment, the club side charging control circuit 902, the club side wireless charging receiver 904, the club side dynamic wireless tag 906, the sensor 908 and the wireless communication module 910 are arranged in a grip of the golf club 90, so that when the golf club 90 is put inside the golf bag 20, the grip of the golf club 90 approaches the in-bag charging apparatus 40, so that the in-bag wireless charging transmitter 408 can more easily utilize the in-bag wireless charging signal 406 to wirelessly charge the golf club 90.

The advantage of the present invention is to provide a golf system with a wireless charging function.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A golf system with a wireless charging function applied to a power supply apparatus, the golf system comprising:
a golf bag, the power supply apparatus arranged outside the golf bag;
an in-bag wireless rechargeable battery apparatus arranged inside the golf bag;
an in-bag charging apparatus arranged inside the golf bag, the in-bag charging apparatus electrically connected to the in-bag wireless rechargeable battery apparatus;
an out-of-bag wireless charging apparatus arranged outside the golf bag, the out-of-bag wireless charging apparatus wirelessly electrically connected to the in-bag wireless rechargeable battery apparatus, the out-of-bag wireless charging apparatus electrically connected to the power supply apparatus; and
an in-bag electronic apparatus arranged inside the golf bag, the in-bag electronic apparatus wirelessly electrically connected to the in-bag wireless charging module,
wherein the in-bag charging apparatus comprises:
an in-bag charging control circuit electrically connected to the in-bag wireless rechargeable battery apparatus; and
an in-bag wireless charging module electrically connected to the in-bag charging control circuit,
wherein the out-of-bag wireless charging apparatus comprises:
an out-of-bag charging control circuit electrically connected to the power supply apparatus;
an out-of-bag wireless charging transmitter electrically connected to the out-of-bag charging control circuit, the out-of-bag wireless charging transmitter wirelessly electrically connected to the in-bag wireless rechargeable battery apparatus; and
an out-of-bag wireless reader-writer electrically connected to the out-of-bag charging control circuit, the out-of-bag wireless reader-writer wirelessly electrically connected to the in-bag wireless rechargeable battery apparatus,
wherein the in-bag wireless rechargeable battery apparatus comprises:
an in-bag battery control circuit electrically connected to the in-bag charging control circuit:
an in-bag wireless charging receiver electrically connected to the in-bag battery control circuit, the in-bag wireless charging receiver wirelessly electrically connected to the out-of-bag wireless charging transmitter; and
an in-bag dynamic wireless tag electrically connected to the in-bag battery control circuit, the in-bag dynamic wireless tag wirelessly electrically connected to the out-of-bag wireless reader-writer, wherein the in-bag battery control circuit comprises:
a rechargeable battery,
wherein the in-bag wireless charging module comprises:
an in-bag wireless charging transmitter electrically connected to the in-bag charging control circuit, the in-bag wireless charging transmitter wirelessly electrically connected to the in-bag electronic apparatus; and
an in-bag wireless reader-writer electrically connected to the in-bag charging control circuit, the in-bag wireless reader-writer wirelessly electrically connected to the in-bag electronic apparatus,
wherein the in-bag electronic apparatus comprises:
an electronic apparatus side charging control circuit;
an electronic apparatus side wireless charging receiver electrically connected to the electronic apparatus side charging control circuit, the electronic apparatus side wireless charging receiver wirelessly electrically connected to the in-bag wireless charging transmitter;
an electronic apparatus side dynamic wireless tag electrically connected to the electronic apparatus side charging control circuit, the electronic apparatus side dynamic wireless tag wirelessly electrically connected to the in-bag wireless reader-writer; and
an electronic device electrically connected to the electronic apparatus side charging control circuit,
wherein the power supply apparatus sends an original voltage to the out-of-bag wireless charging apparatus; after the out-of-bag wireless charging apparatus receives the original voltage, the out-of-bag wireless charging apparatus converts the original voltage into an out-of-bag wireless charging signal; the out-of-bag wireless charging apparatus utilizes the out-of-bag wireless charging signal to wirelessly charge the in-bag wireless rechargeable battery apparatus; the in-bag wireless rechargeable battery apparatus sends a battery voltage to the in-bag charging control circuit; after the in-bag charging control circuit receives the battery voltage, the in-bag charging control circuit sends the battery voltage to the in-bag wireless charging module; after the in-bag wireless charging module receives the battery voltage, the in-bag wireless charging module converts the battery voltage into an in-bag wireless charging signal;
wherein the in-bag wireless charging module utilizes the in-bag wireless charging signal to wirelessly charge the in-bag electronic apparatus;
wherein the power supply apparatus sends the original voltage to the out-of-bag charging control circuit; after the out-of-bag charging control circuit receives the original voltage, the out-of-bag charging control circuit converts the original voltage into an original conversion voltage; the out-of-bag wireless reader-writer wirelessly identifies the in-bag dynamic wireless tag; if the out-of-bag wireless reader-writer wirelessly identifies the in-bag dynamic wireless tag successfully, the out-of-bag wireless reader-writer informs the out-of-bag charging control circuit that the out-of-bag wireless reader-writer wirelessly identifies the in-bag dynamic wireless tag successfully, so that the out-of-bag charging control circuit sends the original conversion voltage to the out-of-bag wireless charging transmitter; after the out-of-bag wireless charging transmitter receives the original conversion voltage, the out-of-bag wireless charging transmitter converts the original conversion voltage into the out-of-bag wireless charging signal; the out-of-bag wireless charging transmitter utilizes the out-of-bag wireless charging signal to wirelessly charge the in-bag wireless rechargeable battery apparatus;
wherein if the out-of-bag wireless reader-writer wirelessly identifies the in-bag dynamic wireless tag successfully, the in-bag battery control circuit utilizes the in-bag dynamic wireless tag to be aware that the out-of-bag wireless reader-writer wirelessly identifies the in-bag dynamic wireless tag successfully, so that the in-bag battery control circuit receives the out-of-bag wireless charging signal through the in-bag wireless charging receiver to charge the rechargeable battery; the in-bag battery control circuit sends the battery voltage to the in-bag charging control circuit;
wherein the in-bag wireless reader-writer wirelessly identifies the electronic apparatus side dynamic wireless tag; if the in-bag wireless reader-writer wirelessly identifies the electronic apparatus side dynamic wireless tag successfully, the in-bag wireless reader-writer informs the in-bag charging control circuit that the in-bag wireless reader-writer wirelessly identifies the electronic apparatus side dynamic wireless tag successfully, so that the in-bag charging control circuit sends the battery voltage to the in-bag wireless charging transmitter; after the in-bag wireless charging transmitter receives the battery voltage, the in-bag wireless charging transmitter converts the battery voltage into the in-bag wireless charging signal; the in-bag wireless charging transmitter utilizes the in-bag wireless charging signal to wirelessly charge the in-bag electronic apparatus;
wherein if the in-bag wireless reader-writer wirelessly identifies the electronic apparatus side dynamic wireless tag successfully, the electronic apparatus side charging control circuit utilizes the electronic apparatus side dynamic wireless tag to be aware that the in-bag wireless reader-writer wirelessly identifies the electronic apparatus side dynamic wireless tag successfully, so that the electronic apparatus side charging control circuit receives the in-bag wireless charging signal through the electronic apparatus side wireless charging receiver to convert the in-bag wireless charging signal into a driving voltage; the electronic apparatus side charging control circuit sends the driving voltage to the electronic device to drive the electronic device.

2. The golf system in claim 1, wherein the electronic device is a refrigerating apparatus, a heating apparatus, a wired charging module or a wireless charging module.

* * * * *